United States Patent
Yahkind et al.

(10) Patent No.: US 8,048,970 B2
(45) Date of Patent: Nov. 1, 2011

(54) REACTION PRODUCT OF MELAMINE ALDEHYDE RESIN AND DIOL

(75) Inventors: Alexander Leo Yahkind, West Bloomfield, MI (US); Xueting Qiu, West Bloomfield, MI (US); Dhruv Vrajlal Parekh, Troy, MI (US)

(73) Assignee: Akzo Nobel Coatings International B.V., Arnhem (NL)

( * ) Notice: Subject to any disclaimer, the term of this patent is extended or adjusted under 35 U.S.C. 154(b) by 431 days.

(21) Appl. No.: 12/066,232

(22) PCT Filed: Sep. 5, 2006

(86) PCT No.: PCT/EP2006/066022

§ 371 (c)(1),
(2), (4) Date: Mar. 7, 2008

(87) PCT Pub. No.: WO2007/028792

PCT Pub. Date: Mar. 15, 2007

(65) Prior Publication Data

US 2008/0207850 A1    Aug. 28, 2008

Related U.S. Application Data

(63) Continuation of application No. 11/221,129, filed on Sep. 7, 2005, now abandoned.

(30) Foreign Application Priority Data

Sep. 21, 2005 (EP) .................................... 05108691

(51) Int. Cl.
| | |
|---|---|
| *B05D 3/02* | (2006.01) |
| *C08L 33/10* | (2006.01) |
| *C08L 61/28* | (2006.01) |
| *C08L 63/00* | (2006.01) |
| *C08L 71/02* | (2006.01) |
| *C08L 75/04* | (2006.01) |
| *C08L 67/02* | (2006.01) |

(52) U.S. Cl. ...................... 525/509; 427/386; 427/388.3; 525/162; 525/406; 525/427; 525/440.01; 525/440.02; 525/456; 525/510

(58) Field of Classification Search ......................... None
See application file for complete search history.

(56) References Cited

U.S. PATENT DOCUMENTS

| | | | | |
|---|---|---|---|---|
| 2,358,276 | A | | 9/1944 | Hodgins et al. |
| 3,293,212 | A | * | 12/1966 | Power et al. ................... 528/211 |
| 3,966,665 | A | | 6/1976 | Sakata et al. |
| 4,271,286 | A | * | 6/1981 | Michel et al. .................. 528/254 |
| 4,528,344 | A | | 7/1985 | Chang |
| 4,855,165 | A | | 8/1989 | Bolgiano et al. |
| 5,750,627 | A | * | 5/1998 | St. Clair ......................... 525/162 |
| 6,753,386 | B1 | * | 6/2004 | Yahkind et al. ................ 525/458 |
| 2002/0000536 | A1 | | 1/2002 | Spitz et al. |
| 2003/0050474 | A1 | * | 3/2003 | Ratzsch et al. ................ 544/204 |
| 2004/0249088 | A1 | | 12/2004 | Hees et al. |

FOREIGN PATENT DOCUMENTS

| | | | | |
|---|---|---|---|---|
| DE | 1620217 | A | * | 9/1966 |
| EP | 199605 | B1 | * | 10/1986 |
| FR | 1274670 | | | 10/1961 |
| GB | 1 308 697 | | | 2/1973 |
| GB | 1465426 | A | * | 2/1977 |
| GB | 1597995 | A | * | 9/1981 |
| WO | WO 03/029318 | A1 | * | 4/2003 |
| WO | WO 03/091347 | A1 | * | 11/2003 |
| WO | WO 2007/020269 | | | 2/2007 |

OTHER PUBLICATIONS

"Cymel Resins for coatings and specialty applications," Cytec Industries, Inc., 2000, 23 pages.*
"Cymel 325 resin," Cytec Industries, Inc., 1999, 2 pages.*
"Cymel 303 crosslinking agents," Cytec Industries, Inc., 2000, 2 pages.*
HCAPLUS accession No. 2001:616927 for the Farbe + Lack article by Schellekens et al., "Polyurethane polyols against acid and scratches," vol. 107, No. 8, 2001 and registry No. 382143-36-4 for 2-buty-2-ethyl-1,3-propandiol-formaldehyde-isophorone diisocyanate-melamine copolymer, 2001, three pages.*
Hans-Georg Elias, "Macromolecules," vol. 3, 2008, p. 26.
Rompp Chemie Lexikon, 9th Edition, 1995, p. 2424.

* cited by examiner

*Primary Examiner* — Robert Sellers
(74) *Attorney, Agent, or Firm* — Kenyon & Kenyon LLP

(57) ABSTRACT

Novel low viscosity oligomeric polyols and the use thereof in coating compositions are disclosed. The novel low viscosity oligomeric polyols may be prepared by reacting at least one melamine aldehyde resin and at least one of $\alpha,\beta$-diol, $\alpha,\gamma$-diol, or mixture thereof. The reaction may occur in the presence of an acid catalyst. Coating compositions with a low VOC able to cure under ambient and forced dry conditions while providing good application and performance characteristics, such as an improved scratch resistance, are also disclosed.

10 Claims, No Drawings

REACTION PRODUCT OF MELAMINE ALDEHYDE RESIN AND DIOL

REFERENCE TO RELATED APPLICATION(S)

This application is the U.S. National Phase of PCT/EP2006/066022 filed on Sep. 5, 2006, which is a continuation of prior U.S. application Ser. No. 11/221,129, filed on Sep. 7, 2005, now abandoned.

The present invention relates to novel low viscosity oligomeric polyols and the use thereof in coating compositions. The novel low viscosity oligomeric polyols are prepared by reacting at least one melamine aldehyde resin and at least one $\alpha,\beta$-diol, $\alpha,\gamma$-diol, or mixture thereof.

BACKGROUND OF THE INVENTION

Many of the high solids automotive coatings presently in use are based upon polymeric systems comprised of a binder comprising either polyester-based or polyacrylic-based polyols and crosslinking agents therefor. These coatings are generally supplied as "one-pack" or "two-pack" systems.

In a typical one-pack system, all of the coating ingredients are combined into one storage-stable mixture. Upon application, the polyol component is crosslinked, generally with an aminoplast resin (such as a melamine resin) or a blocked isocyanate, usually under heat cure conditions of 120° C. or above. In a typical two-pack system, the polyol component is combined with a crosslinking agent, generally an isocyanate, shortly before application, with curing being conducted at ambient and/or elevated temperatures.

Coatings used for painting motor vehicles and repairing the original paint are desired to have good physical properties such as hardness, mechanical strength, and resistance to water, acids, and solvents. The coatings are also desired to have good appearance properties, providing smooth films and a high gloss and high distinctness of image. It is also desirable that such coatings have an excellent car wash, scratch, and mar resistance.

A large number of cars and transport vehicles are coated with a multilayer topcoat system wherein an unpigmented clearcoat is applied over a pigmented basecoat. Both solvent borne and water borne clearcoats and basecoats are in use. So-called metallic basecoats comprise metallic flakes.

For environmental reasons, it is becoming increasingly important to develop polymeric systems with low solution viscosities, which permit the formulation of high solids coatings with low application viscosities suitable for spraying. High solids coatings (generally 50 wt. % or greater solids) significantly decrease the amount of volatile organic compounds (VOC) entering the atmosphere upon drying/curing of the coating.

One way to achieve a lower solvent content is to use so-called high-solids compositions. Such compositions comprise a relatively high level of non-volatile materials such as film forming polymer, pigments, and fillers, and a relatively low level of organic solvent. A problem when formulating high-solids coating compositions is that such compositions have an unacceptably high viscosity due to the high molecular weight of the conventional film forming polymer. The high viscosity gives rise to problems in spray application with poor paint atomization and poor flow-out and, consequently, low gloss levels and poor appearance.

The use of low-molecular weight film forming polymers results in adequate application viscosities. However, coating composition based on this type of resins generally use the crosslinker to have acceptable film properties. But scratch and mar resistance may be negatively influenced, especially in 2K coating compositions.

Polyurethane polyols, such as those described in U.S. Pat. No. 6,753,386, are presently utilized in coating formulations to improve scratch resistant coatings.

However, these polyurethane polyols may be expensive to produce based on the high cost of polyisocyanates. Further, although these polyurethane polyols are effective at low temperatures, it is desirable to have a polyol which has more reactivity in low bake systems.

Melamine formaldehyde resins are utilized as crosslinkers in many coating applications. However, due to their reactivity, these resins have a predisposition toward self-condensation making them difficult to utilize. Further, melamine formaldehyde crosslinkers are generally utilized for high bake systems.

In EP-A-0 199 605, pigment pastes, mainly for use in paints and ink, comprising a pigment dispersing agent and, optionally, an organic solvent are disclosed. The pigment dispersing agent may be obtained by co-condensing a triazine-type amino compound, formaldehyde, a diol, and a monohydric alcohol.

WO 2003/091347 relates to polymeric dispersion additives with hyperbranched structures and the use of modified and unmodified hyperbranched polyurethanes.

WO 2003/029318 relates to polyurethane block copolymers containing one or more hydrophilic groups and the use of such copolymers as crosslinkable dispersion additives for colorant preparations.

U.S. Pat. No. 4,271,286 relates to a process for the preparation of methylolaminotriazines etherified with alkanols having per mole of the aminotriazine 0.6n to 2n methyol groups to the extent of 30% to 60%, n being the number of amino groups in the amino triazine.

GB patent no. 1465426 relates to low viscosity mixture of etherified emthyolaminotriazines with average degree of emthylolation substantially 50% to 80% for use with hydroxyl containing resins.

U.S. Pat. No. 3,293,212 relates to reaction products of hexaalkyl ethers of hexamethylolmelamines and bisphenols.

DE patent no. 1620217 relates to a cleaning process for removing residual glycol in melamine mixture.

U.S. Pat. No. 4,528,344 discloses an ungelled, crosslinkable, hydroxylgroup-containing resin having a molecular weight of less than 4500, which is the reaction product of a nonaromatic polyol having a molecular weight of less than 230, and an aminoplast.

It is an object of the present invention to provide low viscosity oligomeric polyols for use in coating compositions.

It is a further object of this invention to provide low viscosity oligomeric polyols for use in coating compositions that will cure under ambient and forced dry conditions while providing good application and performance characteristics.

It is also an object of this invention to provide low viscosity oligomeric polyols for use in coating compositions with a low VOC.

It is additionally an object of this invention to provide low viscosity oligomeric polyols for use in coating compositions resulting in dried and cured coatings with an improved scratch resistance in particular compared to coatings prepared from a coating composition comprising an acrylic polyol and a polyisocyanate compound.

SUMMARY OF THE INVENTION

In accordance with the present invention, the low viscosity oligomeric polyols (hereinafter referred to as melamine polyols) comprises the reaction product of:

(a) at least one melamine aldehyde resin having the formula (I)

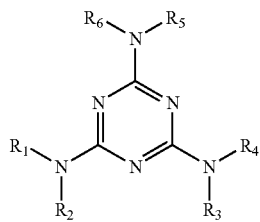

wherein $R_1$ to $R_6$ are each selected from —H, —$CH_2OH$, —$CH_2OR_7$, and may be the same or different, wherein $R_7$ is a $C_1$ to $C_5$ alkyl group,
(b) at least one α,β-diol, α,γ-diol, or mixture thereof, and, optionally,
(c) a compound (c) containing a single functional group capable of reacting with the melamine aldehyde resin and, optionally, other functional groups,
wherein the diol (b) and the resin (a) are reacted in such relative amounts that the ratio of the number of hydroxyl groups from diol (b) to the total number of $R_1$ to $R_6$ groups from resin (a) is in the range of 1.25 to 2.25.

The resulting melamine polyols have a low polydispersity, e.g. Mw/Mn≦3.5, or ≦2.5, or ≦2.

The melamine polyols of the present invention are produced by reacting
(a) at least one melamine aldehyde resin having the formula (I) above,
(b) at least one α,β-diol, α,γ-diol, or mixture thereof, and, optionally,
(c) a compound (c) containing a single functional group capable of reacting with the melamine aldehyde resin and, optionally, other functional groups,
in the presence of an acid catalyst.

Further, the present invention relates to a method (A) of preparing melamine polyols comprising reacting at a temperature between about 50° C. to 130° C.
(a) at least one melamine aldehyde resin having the formula (I) above,
(b) at least one α,β-diol, α,γ-diol, or mixture thereof, and, optionally,
(c) a compound (c) containing a single functional group capable of reacting with the melamine aldehyde resin and, optionally, other functional groups,
in the presence of an acid catalyst, wherein the diol (b) and the resin (a) are reacted in such relative amounts that the ratio of the number of hydroxyl groups from diol (b) to the total number of $R_1$ to $R_6$ groups from resin (a) is in the range of 1.25 to 2.25.

The present invention also relates to another method (B) of preparing melamine polyols comprising
(i) reacting at a temperature between about 50° C. to 80° C.
   (a) at least one melamine aldehyde resin having the formula (I) above,
   (b) at least one α,β-diol, α,γ-diol, or mixtures thereof; and, optionally
   (c) a compound containing a single functional group capable of reacting with the melamine aldehyde resin and, optionally, other functional groups, in the presence of an acid catalyst,
(ii) increasing the temperature of the reaction mixture to between 85° C. and 130° C., and
(iii) distilling the reaction mixture to remove substantially all residual alcohol,
wherein the diol (b) and the resin (a) are reacted in such relative amounts that the ratio of the number of hydroxyl groups from diol (b) to the total number of $R_1$ to $R_6$ groups from resin (a) is in the range of 1.25 to 2.25.

The present invention also relates to coating compositions comprising these novel melamine polyols.

As indicated by resulting molecular weights and hydroxyl values, it has surprisingly been found that the above melamine aldehyde resins react with the above diols predominantly single ended, despite the many potential side reactions, including the self-condensation of the melamine resins.

Further, it was also unexpectedly found that coating compositions prepared from the above diols and the melamine aldehyde resins in situ result in significant shrinkage in the coating, indicating that the present melamine polyols cannot be made in situ in the same ratios.

DETAILED DESCRIPTION OF THE INVENTION

Melamine Polyols

The novel melamine polyols of the present invention are of great utility for coating compositions and comprises the reaction product of:
(a) at least one melamine aldehyde resin having the formula (I)

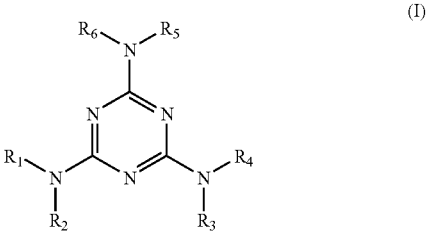

wherein $R_1$ to $R_6$ are each selected from —H, —$CH_2OH$, —$CH_2OR_7$, and may be the same or different, wherein $R_7$ is a $C_1$ to $C_5$ alkyl group,
(b) at least one α,β-diol, α,γ-diol, or mixture thereof, and, optionally,
(c) a compound containing a single functional group capable of reacting with the melamine aldehyde resin and, optionally, other functional groups,
wherein the diol (b) and the resin (a) are reacted in such relative amounts that the ratio of the number of hydroxyl groups from diol (b) to the total number of $R_1$ to $R_6$ groups from resin (a) is in the range of 1.25 to 2.25.

The melamine aldehyde resins useful for the present reaction have the formula (I):

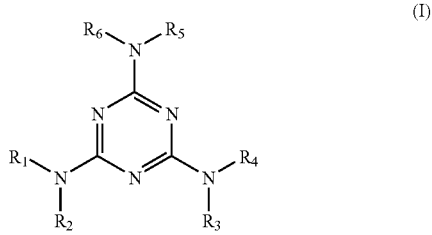

wherein $R_1$ to $R_6$ are each selected from —H, —CH$_2$OH, —CH$_2$OR$_7$, and may be the same or different, wherein $R_7$ is a $C_1$ to $C_5$ alkyl group. In one embodiment, $R_7$ is selected from —CH$_3$ or —C$_4$H$_9$. In another embodiment, $R_1$ to $R_6$ are each —CH$_2$OCH$_3$.

Melamine aldehyde resins of formula (I) are known in the art and many are commercially available. Examples of suitable commercially available melamine aldehyde resins include but are not limited to hexamethoxymethyl (HMMM)-type melamine resins such as Cymel 303 and Cymel 303LF, available commercially from Cytec Industries Inc., and Resimene 747 and Resimene CE7103, available commercially from Surface Specialties.

The melamine aldehyde resin is reacted with an α,β-diol or α,γ-diol, or a mixture thereof.

In one embodiment, the α,β-diol or α,γ-diol has from 2 to 18 carbon atoms. In another embodiment it has 2 to 15 carbon atoms. A further embodiment has 2 to 10 carbon atoms. Examples of suitable diols include but are not limited to ethylene glycol, 1,2 propanediol, 1,3-butanediol, 2-methyl-butane-1,3-diol, cyclopentene-1,3-diol, 1,2-hexanediol, 2-ethyl-1,3-hexanediol (EHDO), 2,2,4-trimethyl-1,3-pentanediol, 1,2-octanediol, 2-butyl-2-ethyl-1,3-propane diol (BEPD), 2,4,4-trimethyl-hexane-3,4-diol, 1,2-decanediol, 2,3,4,5-tetramethyl-hexane-3,4-diol, and 1,2-octadecanediol.

Optionally, a third compound (c) can be used to prepare the novel melamine polyols. These compounds contain a single functional group capable of reacting with the melamine aldehyde resin (c1) or these compounds contain a single functional group capable of reacting with the melamine aldehyde resin and other functional groups (c2).

Examples of compounds (c1) are mono-alcohols. Examples of the other functional groups from compounds (c2) include carboxyl-functional groups, ethylene oxide functional groups, ethylenically unsaturated groups, mercapto functional groups, acetoacetate functional groups, and mixtures thereof. Also, mixtures of compounds (c1) and (c2) can be used.

For example, stable low molecular weight hydrophilic melamine polyols for water reducible application can be produced by reacting carboxyl- or ethylene oxide functional compounds with the melamine aldehyde resin and the diol. An example of such a compound is 2,2-bis(hydroxylmethyl) propionic acid. For UV curing applications, ethylenically unsaturated compounds such as anhydride functional compounds, such as maleic anhydride, or hydroxyl functional (meth)acrylate monomers may be reacted with the melamine aldehyde resin and the diol. A mercapto functional melamine polyol can be designed by reacting the melamine aldehdyde resin and the diol with a mercapto functional compound. A coating composition comprising a mercapto functional melamine polyol may react with polyisocyanate and epoxy resins at low temperature. For applications requiring good adhesion and corrosion resistance, such as primers, and even lower viscosity, acetoacetate monomers can be incorporated into the melamine polyol. An example of such a compound is methoxy acetate.

In one embodiment, compound (c) is a monoalcohol. Monofunctional alcohols can be linear or branched, cyclic or acyclic, and the alcohols can be primary, secondary or tertiary. In one embodiment, aliphatic $C_{1-24}$ monoalcohols are used; in another $C_{6-20}$ monoalcohols are used. Examples include methanol, ethanol, butanol, 2-ethyl hexanol, cyclohexanol, benzyl alcohol, stearyl alcohol, 4-tert. butyl cyclohexanol, and mixtures thereof. Compound (c) can be branched monoalcohols, such as Guerbet alcohols. Guerbet alcohols are branched, primary monofunctional alcohols that have two linear carbon chains with the branch point always at the second carbon position. Guerbet alcohols are chemically described as 2-alkyl-1-alkanols. Examples of Guerbet alcohols include 2-ethyl-1-hexanol, 2-hexyl-1-decanol, 2-octyl-1-decanol, 2-octyl-1-dodecanol, 2-hexyl-1-dodecanol, and mixtures thereof. Guerbet alcohols are commercially available from Sasol Chemie GmbH as Isofolo® alcohols.

When a compound (c) is used, the melamine aldehyde resin, the diol, and compound (c) are reacted together in an amount such that the ratio of hydroxyl groups and the single functional group capable of reacting with the melamine aldehyde resin of compound (c) to the total number of $R_1$ to $R_6$ groups is typically in the range of 0.5 to 3, or 1 to 2.5, or 1.25 to 2.25.

In one embodiment the melamine polyols of the present invention have a number average molecular weight between 700 and 4000; in another embodiment between 1500 and 3000. Within these ranges, the molecular weight of the melamine polyol may be customized through the choice of the diol utilized for the reaction. In one embodiment, the melamine polyols have a low polydispersity, such as Mw/Mn≦3.5, ≦2.5, or ≦2. The melamine polyols of the present invention have a hydroxyl equivalent weight of 75 to 350, in one embodiment in the range of 100 to 300.

Preparation of the Melamine Polyols

The melamine aldehyde resin and α,β-diol or α,γ-diols may be reacted in the presence of an acid catalyst. The acid catalyst may be blocked or unblocked. Examples of suitable catalysts include but are not limited to mineral acids, such as hydrochloric acid, nitric acid, and sulphuric acid, dodecylbenzene sulphonic acid (DDBSA), dinonylnaphthalene sulphonic acid (DNNSA), oxalic acid, hexamic acid, phosphoric acid, alkyl phospahate esters, phthalic acid, copolymerized acrylic acid, and metal salt catalysts, such as magnesium bromide. Zinc or magnesium nitrates may also be utilized, although discoloration may occur at temperatures greater than about 120° C. Sulphonic acids such as paratoluene sulphonic acid (PTSA) is less corrosive to equipment as the mineral acids may negatively influence the coating properties. Of course, the particular choice of catalyst type and amount will be dictated upon a number of factors such as the chosen components being reacted and the chosen reaction conditions. These and other factors are well-known to those skilled in the art, who can make proper choices accordingly. The skilled person may also choose catalyst type and amount that will limit the amount of residual diol in the reaction mixture. Further, due to the tendency of melamine resin to self-condense, the catalyst should be chosen based on the reaction temperature being utilized.

In one embodiment, the acid catalyst is present in an amount ranging from 0.001 to 5 wt. % on solids; in another 0.01 to 7.5 wt. %, in yet another 0.1 to 5 wt. %.

Optionally, solvents may be added to the present reaction. Suitable solvents include but are not limited to ketones, ester acetates, alcohols and aromatics. Water-miscible solvents may be used such as N-methyl-2-pyrrolidone and dipropylene glycol dimethyl ether. In one embodiment the solvent is butyl acetate.

A neutralizing agent may be added after the reaction to neutralize the acid catalyst. Examples include tri ethyl amine, 2-(dimethylamino)-2-methyl-1-propanol, 2-amino-2-methyl-1-propanol, 2-imino-a-phenyl-3-thiazolidine ethanol, diethylene triamine, dimethylethanolamine, isophoronediamine, morpholine, N,N-diethyl-p-phenylenediamine, N-ethylmorphonoline, piperidine, pyridine, triethanolamine, and trimethylhexanediamine.

The preparation may be carried out under a nitrogen blanket.

The novel melamine polyols of the present invention may be produced at least by one of three processes depending upon the desired molecular weight and solids content characteristics of the resulting melamine polyol.

Method A

In one embodiment, the melamine aldehyde resin(s) is fed into the diol component(s), in the presence of the catalyst, at a temperature range between about 50° C. and about 130° C. during a two to three hour time period and held for an additional time period after such feeding is complete. Subsequently, a neutralizing agent may be added to neutralize the acid catalyst. In one embodiment, the reaction is carried out at temperatures between about 95° C. and 130° C.; in another embodiment between 115° C. and 120° C. The resulting melamine polyols have, relative to other melamine polyols according to this invention, high number average molecular weights between about 2000 to 3000. Such melamine polyols also have low viscosities, e.g. between about 25 cps and 700 cps, i.e. Brookfield viscosity measured at 40% solid content at 25° C., spindle #4 and 20 RPM, which makes them particularly useful for spray applied coating compositions.

Method B

In another, embodiment, the melamine aldehyde resin(s) is fed into the diol component(s) at a temperature between about 50° C. and about 80° C., typically for 2-3 hours, followed by acid catalyst neutralization and alcohol distillation at a temperature about 85° C. to about 130° C. Subsequently, another amount of neutralizing agent may be added to neutralize the acid catalyst further. Melamine polyols that are the reaction product of this process B will have, relative to other melamine polyols of the present invention, a low number average molecular weight, e.g. between about 1500 to 2000. Such melamine polyols have Brookfield viscosities, between about 1500 cps and 1800 cps at 25° C., measured as mentioned above at 70% solid content.

Method C

Alternatively, the process can be carried out under vacuum. Then, the melamine aldehyde resin(s) is fed into the diol component(s) at a temperature between about 50° C. and about 80° C. under a vacuum of 50 to 100 mbar, in one embodiment for 2-3 hours, followed by acid catalyst neutralization and alcohol distillation at a temperature about 50° C. and about 80° C. under a vacuum of 50 to 100 mbar. Subsequently, another amount of neutralizing agent may be added to neutralize the acid catalyst further.

Coating Compositions Comprising Melamine Polyols

The invention also relates to coating compositions comprising at least one melamine polyol and at least one crosslinker.

There are numerous kinds of hydroxyl group-reactive crosslinkers which can be used with the melamine polyols, such as polyisocyanates, blocked polyisocyanates and/or aminoplast resins.

The aminoplast resins are generally speaking aldehyde condensation products of melamine, urea, benzoguanamine or similar compounds. The most commonly used aldehyde is formaldehyde. These condensation products contain methylol or similar alkylol groups, and these alkylol groups are commonly at least partly etherified with an alcohol, such as methanol or butanol, to form alkylated ethers. The crosslinker resin can be substantially monomeric or polymeric depending on the desired final properties of the cured coating. Monomeric melamine resins allow the formulation of coatings with higher solids contents. Polymeric melamines are useful in coatings where the use of a strong acid catalyst should be avoided. Examples of readily available amino crosslinkers of the kind described above include: hexamethoxymethylmelamine, such as Cymel 303, available from Cytec Industries, Inc.; mixed ether methoxy/butoxy methylmelamine, such as Cymel 1135, also available from Cytec; polymeric butoxy methylmelamine, such as M-281-M, available from Cook Composites and Polymers; and high imino polymeric methoxymethylmelamine, such as Cymel 325, available from Cytec. This list could include many other crosslinkers which differ by degree of polymerization, imino content, free methylol content, and ratios of alcohols used for etherification.

These aminoplast crosslinking agents can be utilized in widely varying weight ratios of melamine polyol to aminoplast, generally ranging from about 90:10 to 40:60, and in one embodiment about 90:10 to 50:50.

The polyisocyanate compound is a cross-linker which reacts with hydroxy groups. Polyisocyanates are compounds with two or more isocyanate groups per molecule, and are well-known in the coating art. Suitable polyisocyanates are aliphatic polyisocyanates such as trimethylene diisocyanate, 1,2-propylene diisocyanate, tetramethylene diisocyanate, 2,3-butylene diisocyanate, hexamethylene diisocyanate, octamethylene diisocyanate, 4-isocyanatomethyl-1,8-octane diisocyanate, 2,2,4-trimethyl hexamethylene diisocyanate, 2,4,4-trimethyl hexamethylene diisocyanate, dodecamethylene diisocyanate, $\alpha,\alpha'$-dipropyl ether diisocyanate, and trans-vinylidene diisocyanate; alicyclic polyisocyanates, such as 1,3-cyclopentylene diisocyanate, 1,2-cyclohexylene diisocyanate, 1,4-cyclohexylene diisocyanate, 4-methyl-1,3-cyclohexylene diisocyanate, 4,4'-dicyclohexylene diisocyanate methane, 3,3'-dimethyl-4,4'-dicyclohexylene diisocyanate methane, norbornane diisocyanate, and isophorone diisocyanate; aromatic polyisocyanates such as m- and p-phenylene diisocyanate, 1,3- and 1,4-bis(isocyanate methyl)benzene, 1,5-dimethyl-2,4-bis(isocyanate methyl)benzene, 1,3,5-triisocyanate benzene, 2,4- and 2,6-toluene diisocyanate, 2,4,6-toluene triisocyanate, $\alpha,\alpha,\alpha',\alpha'$-tetramethyl o-, m-, and p-xylylene diisocyanate, 4,4'-diphenylene diisocyanate methane, 4,4'-diphenylene diisocyanate, 3,3'-dichloro-4,4'-diphenylene diisocyanate, and naphthalene-1,5-diisocyanate; and mixtures of the aforementioned polyisocyanates.

Also, such compounds may be adducts of polyisocyanates, e.g., biurets, isocyanurates, allophonates, uretdiones, prepolymers of polyisocyanates, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the reaction product of 3 moles of m-$\alpha,\alpha,\alpha',\alpha'$-tetramethylxylene diisocyanate with 1 mole of trimethylol propane, the adduct of 1 molecule of pentaerythritol to 4 molecules of toluene diisocyanate, the isocyanurate of hexamethylene diisocyanate, available from Bayer under the trade designation Desmodur® N3390 and Desmodur® LS2025, the uretdione of hexamethylene diisocyanate, available from Bayer under the trade designation Desmodur® N3400, the allophonate of hexamethylene diisocyanate, available from Bayer under the trade designation Desmodur® LS 2101, the adduct of 3 moles of toluene diisocyanate to 1 mole of trimethylol propane, available from Bayer under the trade designation Desmodur® L, and the isocyanurate of isophorone diisocyanate, available from Hüls under the trade designation Vestanat® T1890. Furthermore, (co)polymers of isocyanate-functional monomers such as $\alpha,\alpha'$-dimethyl-m-isopropenyl benzyl isocyanate are suitable for use.

The above-mentioned isocyanates and adducts thereof may be present in the form of blocked isocyanates, as is known to the skilled person. The blocking agents for the blocked polyisocyanate can be ketoximes, alcohols, phenolic compounds, malonic esters or acetoacetates.

The polyisocyanate compound is used in an amount such that the ratio of isocyanate groups to the total number of hydroxy groups in the coating composition is in the range 0.5 to 3, and in one embodiment 0.8 to 2.

The coating composition can also comprise catalysts. Examples of catalysts for the isocyanate-hydroxy reaction include dibutyl tin dilaurate, triethyl amine, and the like. Generally, 0.1 to 5 percent by weight of the active catalyst is used, based on the coating formulation nonvolatile content.

Acid catalysts are used to increase the rate of the crosslinking reaction in melamine-cured compositions. Generally, 0.1 to 5 percent by weight of the active catalyst is used, based on the coating formulation nonvolatile content. These acids may be blocked by a suitable compound, so that the catalyst is inactive until the coating is baked. Optionally, the catalyst may be used in an unblocked form, which may necessitate the formulation of a two-component coating. Examples of acids which may be used include phosphoric acid, alkyl acid phosphates, sulfonic acid and substituted sulfonic acids, and maleic acid or alkyl acid maleates. Examples of readily available catalysts include: para-toluenesulfonic acid (PTSA) such as Cycat 4040, available from Cytek; dodecylbenzene sulfonic acid (DDBSA) such as Bio-Soft 5-100, available from Stepan; phenyl acid phosphate (PAP); amine blocked DDBSA, such as Nacure 5226 and Nacure XP-158, available from King Industries, amine blocked PTSA, such as VP-451, available from Byk-Mallinckrodt; dinonylnaphthalene disulfonic acid (DNNDSA); and maleic acid. This list could include numerous additional catalysts (blocked and unblocked) known to those skilled in the art. The type of catalyst used is determined by the desired bake schedule.

The coating compositions may also contain pigments. Inorganic as well as organic pigments can be used. The composition can further comprise conventional additives, such as stabilizers, surfactants, fillers, UV-absorbers, catalyst blockers, anti-oxidants, pigment dispersants, flow additives, rheology control agents, levelling agents, and solvents. The solvent can be any solvent known in the art, i.e. aliphatic and/or aromatic hydrocarbons. Examples include Solvesso® 100, toluene, xylene, butanol, isopropanol, butyl acetate, ethyl acetate, acetone, methyl isobutyl ketone, methyl isoamyl ketone, methyl ethyl ketone, ether, ether alcohol, and ether ester, or a mixture of any of these.

In addition to the melamine polyols and the crosslinker other compounds may be present in the coating composition according to the present invention. Such compounds may be main binders and/or reactive diluents. Examples include hydroxyl-functional binders, e.g., polyester polyols, polyether polyols, polyacrylate polyols, polyurethane polyols, cellulose acetobutyrate, hydroxyl-functional epoxy resins, alkyds, and dendrimeric polyols. These hydroxyl-functional binders can be utilized in widely varying weight ratios of melamine polyol to hydroxyl-functional binders, generally ranging from about 10:90 to 90:10, and in one embodiment from about 25:75 to 75:25.

In one embodiment the coating composition comprises less than 500 g/l of volatile organic solvent based on the total composition; in another embodiment less than 480 g/l; in yet another embodiment less than 420 g/l. The solid content in one embodiment is higher than 50 wt. %; in another embodiment higher than 52 wt. %; and in yet another higher than 58 wt. %.

The coating compositions are formulated in a 1-, 2-, or 3-component system, depending on the choice of crosslinker and catalyst in the system.

The coating composition of the present invention may be applied to any substrate. The substrate may be, for example, metal, plastic, wood, glass, ceramic, or another coating layer. The other coating layer may be comprised of the coating composition of the current invention or it may be a different coating composition. The coating compositions of the current invention show particular utility as clearcoats, basecoats, pigmented topcoats, primers, and fillers. One embodiment of the current invention is the use of the coating composition of the present invention as clearcoat. In the case of the coating composition being a clearcoat, the basecoat may be a conventional basecoat known in the coating art. The clearcoat composition is then applied to the surface of a basecoat and then cured. An intermediate curing step for the basecoat may be introduced.

The coating compositions can be applied by conventional means such as by spray gun, brush, or roller. Curing temperatures are in one embodiment between 0 and 200° C., and in another embodiment between 20 and 100° C.

The compositions are particularly suitable in the preparation of coated metal substrates, such as in the refinish industry, such as in the body shop, to repair automobiles and transportation vehicles and in finishing large transportation vehicles such as trains, trucks, buses, and aeroplanes. The coating compositions comprising the novel melamine polyols are also well in the preparation of coated plastics. Plastics are used in an increasing number of interior and exterior applications in the automotive industry, such as airbag covers, bumpers, fascias, fenders, wing mirrors, door panels, panel hoods, panel roofs, and panel trunk lids. In another embodiment, coating formulations according to the present invention also can be used for a wide range of industrial coating applications including coil and wood.

The foregoing description is further illustrated by the following examples.

Methods

In the Examples set forth below the following methods were used.

The Brookfield viscosity (CPS) was measured at 25° C., spindle #4, and 20 RPM.

The number average and weight average molecular weights were measured using polystyrene standard 1940.

The solid content was measured using ASTM 2D2369.

The heat stability was tested at 120° F. (50° C.) for 6 weeks.

Adhesion was tested as crosshatch according to ASTM D 3359-95, Standard Test Methods for Measuring Adhesion by Tape Test.

Persoz hardness was tested according to ASTM D 4366-95, Standard Test Methods for Hardness of Organic Coatings by Pendulum Damping Tests, test method B—Persoz Pendulum Hardness Test.

Tukon hardness was tested according to ASTM 1474.

The MEK double rub test is a standard test known in the art for determining solvent resistance. The test involves saturating a cloth with methyl ethyl ketone and rubbing the coating panels with one complete forward and backward motion over the coating surface.

Film thickness was measured with a Fisher Permascope.

EXAMPLES

Preparation of Melamine Polyols

Examples 1 to 3 and Comparative Examples A and B

Method A

A HMMM-type melamine resin was reacted with an α,β-diol or α,γ-diol (examples 1, 2 and 3) and with 1,4- and 1,6-diols (comparative examples A and B). For all tests, 105.7 g of Resimene CE 7103 was fed at 120° C. into a suitable reactor containing the 1.67 times equivalents of the below specified diol (the ratio of the number of OH groups from the diol to the number of $OCH_3$ groups from the resin [the $OH:OCH_3$ ratio] thus was 1.67), 40 wt. % n-butyl acetate on total, and 0.5 wt. % of paratoluene sulphonic acid, based on solids, for 2 to 3 hours and held for an additional hour after feeding. The use of the 1,4- and 1,6-diols, as compared to the α,β-diols and α,γ-diols, resulted in gellation during the reaction. The Brookfield viscosity at 40 wt. % solid content and the molecular weights of the melamine polyols according to the present invention were determined and are listed in Table 1.

TABLE 1

| Ex. | Type of Diol | Viscosity | Mw | Mn | D (Mw/Mn) |
|---|---|---|---|---|---|
| 1 | Ethylene glycol | 100 | 2003 | 817 | 2.45 |
| 2 | 2-butyl-2-ethyl-1,3-propanediol | 45 | 3361 | 1802 | 1.865 |
| 3 | 1,3-butanediol | 60 | 5575 | 1723 | 3.23 |
| A | 1,4-butanediol | Gelled | n.d. | n.d. | n.d. |
| B | 1,6-hexane diol | Gelled | n.d. | n.d. | n.d. |

Example 4

Method A

A melamine polyol was prepared by adding 130 g of Cymel 303 LF to a mixture of 322 g of 2-butyl-2-ethyl-1,3-propanediol, 100 g butyl acetate, and 2.5 g of paratoluene sulphonic acid over 2 to 3 hours under 120 to 130° C. The $OH:OCH_3$ ratio was 2:1. The reaction was held for an additional hour after the feed was finished.

The resulting melamine polyol has a Mn of 2167, a Mw of 5680, and a dispersity of 2.62. The solid content was 43%. The Brookfield viscosity was 38 cps. The theoretical OH equivalent weight is 160.

Example 5

Method A

A melamine polyol was prepared by adding 720 g of Cymel 303 to a mixture of 1200 g of 2-butyl-2-ethyl-1,3-propanediol, 690 g butyl acetate, and 9.6 g of paratoluene sulphonic acid over 2 hours under 115 to 120° C. The $OH:OCH_3$ ratio was 1.34:1. The reaction was held for an additional hour after the feed was finished.

The resulting melamine polyol has a Mn of 2680, a Mw of 8043, and a dispersity of 3. The solid content was 60%. The Brookfield viscosity was 445 cps. The experimental OH equivalent weight is 240.

Example 6

Method B

A melamine polyol was prepared by adding 853 g of Cymel 303 to a mixture of 1409 g of 2-butyl-2-ethyl-1,3-propanediol, 200 g butyl acetate, and 11 g of paratoluene sulphonic acid over 2 hours under 70° C. The $OH:OCH_3$ ratio was 1.34:1. The reaction was held for an additional hour at 70° C. after the feed was finished. 7.8 g of N,N-dimethyl benzyl amine was added to neutralize the paratoluene sulphonic acid. Then, the temperature was raised to 105° C. to distil the methanol until a yield of 85% was reached The resulting melamine polyol has a Mn of 1997, a Mw of 5372, and a dispersity of 2.69. The solid content was 70%. The Brookfield viscosity was 1570 cps. The experimental OH equivalent weight is 225.

Examples 7 to 10

Melamine polyols were prepared and tested for heat stability. The solid content, viscosity, and molecular weights were measured for four polyols both initially (Table 2-A) and after six weeks (Table 2-B).

The melamine polyol according to example 7 was prepared in a similar way as the method described in example 5 (Method A).

The melamine polyol according to example 8 was the melamine polyol according to example 7, but triethyl amine was added as a neutralizer after the reaction was completed (Method A).

The melamine polyol according to example 9 was prepared in a similar way as the method described in example 6 (Method B).

The melamine polyol according to example 10 was the melamine polyol according to example 9, but triethyl amine was added as a neutralizer after the reaction was completed (Method B).

TABLE 2-A

Initial

| Ex. No. | Solid content (%) | Brookfield Viscosity | Mn/Mw | Dispersity |
|---|---|---|---|---|
| 7 | 60.8 | 690 | 2121/7290 | 3.43 |
| 8 | 60.4 | 660 | 2121/7290 | 3.43 |
| 9 | 68.2 | 1545 | 1858/5962 | 3.2 |
| 10 | 68.0 | 1540 | 1858/5962 | 3.2 |

TABLE 2-B

Six Weeks

| Ex. No. | Solid content (%) | Brookfield Viscosity | Mn/Mw | Dispersity |
|---|---|---|---|---|
| 7 | 61.8 | 1420 | 3366/10998 | 3.27 |
| 8 | 59.7 | 590 | 2369/7542 | 3.2 |
| 9 | 68.7 | 1735 | 2260/8074 | 3.57 |
| 10 | 68.1 | 1510 | 1964/6016 | 3.06 |

Example 11

Monoalcohol Modified Melamine Polyol (Method B)

A monoalcohol modified melamine polyol was prepared by adding 1365 g of Cymel 303 to a mixture of 1512 g of 2-butyl-2-ethyl-1,3-propanediol, 530 g butyl acetate, 591.5 g of 2-ethyl-1-hexanol, and 17.4 g of paratoluene sulphonic acid over 1-3 hours under 90° C. The reaction was held for an additional 30 minutes at 90° C. after the feed was finished. Then 12.5 g of N,N-dimethyl benzyl amine was added to neutralize the paratoluene sulphonic acid before raising the temperature to 105° C. A total of 350 g distillates were collected.

The resulting melamine polyol has a Mn of 1673, a Mw of 4520, and a dispersity of 2.7. The solid content was 72.2%.

Example 12

Water Reducible Melamine Polyol (Method A)

A water reducible melamine polyol was prepared by adding 245.7 g of Cymel 303 to a mixture of 350 g of 2-butyl-2-ethyl-1,3-propanediol, 46.9 g of 2,2-bis(hydroxyl methyl) propionic acid, 50 g of N-methyl-2-pyrrolidine, 10 g of dipropylene glycol dimethyl ether, and 3 g of paratoluene sulphonic acid over 1.5 hours under 95° C. The reaction was held for an additional 30 minutes at 95° C. after the feed was finished. The batch was cooled and 35 g of triethyl amine was added to neutralize the paratoluene sulphonic acid.

The resulting melamine polyol has a Mn of 2037, a Mw of 7691, and a dispersity of 3.78. The solid content was 60.1%.

Example 13

Acetoacetate Modified Melamine Polyol (Method B)

An acetoacetate modified melamine polyol was prepared by adding 856.6 g of Cymel 303 to a mixture of 1057 g of 2-butyl-2-ethyl-1,3-propanediol, 143 g butyl acetate, 255 g of methoxy acetate, and 10.9 g of paratoluene sulphonic acid over 1.5 hours under 90 to 95° C. The reaction was held for an additional 30 minutes at 90° C. after the feed was finished. Then 7.5 g of N,N-dimethyl ethanol amine was added to neutralize the paratoluene sulphonic acid before raising the temperature to 105° C. Methanol was collected until a yield of about 80% was reached The resulting melamine polyol has a Mn of 1636, a Mw of 4859, and a dispersity of 2.97. The solid content was 64.5%.

Example 14

Preparation of Melamine Polyol Under Vacuum (Method C)

A melamine polyol was prepared by adding 170.6 g of Cymel 303 to a mixture of 281.8 g of 2-butyl-2-ethyl-1,3-propanediol and 2.2 g of paratoluene sulphonic acid over about 3 hours under 55-60° C. at 80 mbar. The $OH:OCH_3$ ratio was 1.49. The reaction was held for an additional hour at 65° C. after the feed was finished. The batch was cooled and 1.8 g of N,N-dimethyl benzyl amine was added to neutralize the paratoluene sulphonic acid. Then, the temperature was raised to 60° C. at 80 mbar to distil the methanol.

The resulting melamine polyol has a Mn of 2534, a Mw of 9995, and a dispersity of 3.94. The solid content was more than 95%.

Example 15

Preparation of Melamine Polyol (Method B)

In a 12 l flask equipped with mechanical stirrer, thermocouple with thermowatch, heating mantle, dean stark trap, and an additional port fitted with a masterflex pump and #16 Viton tubing, under a nitrogen blanket, a mixture of 4931.5 g of 2-butyl-2-ethyl-1,3-propanediol, 700 g of n-butyl acetate, and 38.5 g of paratoluene sulphonic acid was loaded. The mixture was heated to 70° C. and held until the diol was melted and formed a homogeneous solution. At a mixing speed of 150 RPM and at 70° C. a mixture of 2985.5 g Cymel 303 and 850 g of n-butyl acetate was added drop wise over a 1 to 2 hours period using the masterflex pump.

After the addition of the Cymel 303 mixture was completed, the reaction mixture was held for one hour at 70° C. Subsequently, 18.07 g of dimethyl ethanol amine was added and the temperature was increased to 105° C. Methanol distillation began at +95° C. The temperature was kept at 105° C. until the desired amount of methanol was collected (the theoretical amount of methanol that can be collected is 985 g). This took one to two hours. The batch was cooled down to 60° C. Dimethyl ethanol amine was added to neutralize the acid based on measured acid value (100% acid neutralization).

The resulting melamine polyol has a Mn of 1518, a Mw of 3912, and a dispersity of 2.6.

Examples 16 to 19

Melamine polyols were prepared and tested for heat stability. The molecular weights were measured for four polyols after three weeks (Table 3).

The melamine polyol according to example 16 was prepared according to Example 15 except that the acid was not neutralized after the reaction (0% acid neutralization).

The melamine polyol according to example 17 was prepared according to Example 15 except that the acid was neutralized for 50% after the reaction.

The melamine polyol according to example 18 was prepared according to Example 15.

The melamine polyol according to example 19 was prepared according to Example 15 except that the acid was neutralized for 150% after the reaction.

The initial molecular weights were: Mn 1518 and Mw 3912.

TABLE 3

| Ex. No. | | Mn/Mw | Dispersity |
|---|---|---|---|
| 16 | 0% acid neutr. | 1659/4535 | 2.73 |
| 17 | 50% acid neutr. | 1615/4290 | 2.66 |
| 18 | 100% acid neutr. | 1571/4086 | 2.6 |
| 19 | 150% acid neutr. | 1559/4065 | 2.6 |

Coating Compositions

Examples 20 and 21 and Comparative Example C

Two melamine polyols prepared according to examples 4 and 5 were used to prepare a 1K coating composition with Cymel 303 as a crosslinker in an amount of 80 wt. % melamine polyol and 20 wt. % crosslinker based on total solids and 1% based on total solids of a catalyst, i.e. dodecylbenzene sulfonic acid. Comparative Example C utilized a polyurethane polyol prepared from 2-butyl-2-ethyl-1,3-propanediol and Desmodur® N3300 ex Bayer in an equivalent ratio of OH:NCO of 2:1 (PUPO). All three coating formulations of less than 420 g/l VOC were coated onto cold roll steel and cured at 250° F. for 30 minutes. The Tukon hardness was measured after 72 hours and the MEK Double Rubs were tested after 24 hours.

TABLE 4

| Ex. No. | Type of Polyol | Tukon Hardness | MEK Double Rubs |
|---|---|---|---|
| 20 | Ex. 4 | 10.8 | 100+ |
| 21 | Ex. 5 | 13.0 | 100+ |
| C | PUPO | 16.9 | 100+ |

As can be seen in the above Table 4, all of the test panels were unchanged after 100 double rubs. Thus, the melamine polyols of the present invention produced 1K coatings that had good chemical resistance and good film hardness.

Examples 22 and Comparative Example D

A melamine polyol prepared according to example 5 was used to prepare a 2K coating composition with Desmodur® N3300 as a crosslinker in an equivalent ratio of NCO:OH of 1.2:1. No catalyst was utilized. Comparative Example D utilized the above-mentioned PUPO. The two coating formulations (less than 420 g/l VOC) were coated onto cold roll steel and cured at 180° F. (80° C.) for 30 minutes. The dry film thickness was 1.4-1.5 mils. The Tukon hardness was measured after 1 hour, 24 hours, and 72 hours and the MEK Double Rubs were tested after 72 hours.

TABLE 5

| Ex. No. | Type of Polyol | Tukon Hardness | | | MEK Double Rubs |
|---|---|---|---|---|---|
| | | 1 hr | 24 hr | 72 hr | |
| 22 | Ex. 5 | 2.3 | 7.2 | 12.3 | 100+ |
| D | PUPO | 5.42 | 9.73 | 10.1 | 100+ |

As can be seen in the above Table 5, all of the test panels were unchanged after 100 double rubs. Thus, the melamine polyol of the present invention produced a 2K coating that had good chemical resistance and good film hardness.

Examples 23 to 25

A melamine polyol prepared according to example 5 was utilized to produce a 2K coating formulation with Desmodur® N75 ex Bayer as a crosslinker in an equivalent ratio of NCO:OH of 1.1:1. No catalyst was utilized. Steel panels were coated with the 2K formulation (less than 420 g/l VOC) and subject to curing at different temperatures. The panels were tested after 24 hours for film thickness, hardness, MEK, and adhesion.

TABLE 6

Temperature Effects

| Ex. No. | Curing Conditions | | Film Thickness (mils) | Hardness (Persoz) | MEK (Double Rub) | Adhesion |
|---|---|---|---|---|---|---|
| | Temp. | Time | | | | |
| 23 | Ambient | 24 hr | 2.16 | 65 | 62 | 10 |
| 24 | 140 F. | 10 min | 2.39 | 55 | 90 | 10 |
| 25 | 180 F. | 10 min | 2.56 | 100 | 100+ | 10 |

As can be seen in the above Table 6, 2K coatings comprising melamine polyols according to the present invention provided excellent properties at a range of curing temperatures.

Example 26

A melamine polyol prepared according to example 4 was utilized to produce a 2K coating with Desmodur® N75 ex Bayer as a crosslinker in an equivalent ratio of NCO:OH of 1.1:1. No catalyst was utilized. A steel panel was coated with the 2K formulation (less than 420 g/l VOC) and subject to curing at ambient temperature. After one week, film thickness, hardness and MEK of the coating were measured.

TABLE 7

Ambient Curing

| Ex. No. | Film Thickness (mils) | Hardness (Persoz) | MEK (Double Rub) |
|---|---|---|---|
| 26 | 2.02 | 241 | 100+ |

As can be seen above, the 2K coating formulation demonstrated excellent properties at ambient temperature cure.

Examples 27 and 28 and Comparative Example E

Three 420 g/l VOC clear coat formulations were prepared as set forth in the Table 8 below.

TABLE 8 clear coat formulations

| Raw material | Example 27 % by weight | Example 28 % by weight | Comparative Example E % by weight |
|---|---|---|---|
| Melamine polyol from Example 6 | 16.14 | 17.60 | — |
| Polyacrylate polyol Setalux 27-9712 | 29.43 | — | 49.33 |
| Polyester polyol Setal 26-9552 | — | 30.12 | — |
| Arylic flow control agent Coroc A 620 ex CCP | 0.45 | 0.50 | 0.45 |
| 10% dibutyl tin dilaurate solution | 0.05 | 0.06 | 0.05 |
| 1,2-Propane diol methyl acetate | 2.74 | 2.97 | 2.73 |
| Butyl acetate | 27.24 | 22.69 | 27.31 |
| isocyanurate of hexamethylene diisocyanate (Desmodur N3390) | 23.95 | 26.06 | 20.13 |
| total | 100.00 | 100.00 | 100.00 |

Steel panels were coated with a black two component Akzo Nobel AT 331 basecoat at a dry film thickness of about 20 microns. The clear coat compositions as prepared above were applied by spray gun over the basecoat in a wet-on-wet application. The coatings were baked at 180° F. (82° C.) for 30 minutes. The properties of the coating compositions were compared to the control system where the clear coat had no melamine polyol.

All systems performed similar in terms of cure response as measured by Tukon hardness and MEK double rubs.

One test where the compositions according to the invention performed superior to the control coating composition was the gloss retention by the Car Wash test. The ability of a coating to perform against scratches encountered during car wash is simulated in the Car wash bench tester, approved as test equipment in OEM specification. The % gloss loss after the test is a measurement of scratch resistance. How much lower the number, how much better the scratch resistance.

In duplicate testing for this test, the coating composition of Example 27 based on acrylic polyol showed about 50% less reduction in gloss than the control E. The coating composition of Example 28 based on polyester polyol showed about 30% less reduction in gloss than the control E.

Example 29 and Comparative Example F

A melamine polyol prepared according to example 2 was evaluated in a 1K clear coat along with a coating composition comprising the reactants Cymel 303 and 2-n-butyl-2-ethyl-1, 3-propanediol in the same ratio as used to prepare the melaminepolyol. The 1K coating composition comprises the melamine polyol or its reactants and Cymel 303 as a crosslinker in an amount of 80 wt. % melamine polyol and 20 wt. % crosslinker based on total solids and 0.5 wt. % based on total solids of a catalyst, i.e. blocked dodecylbenzene sulfonic acid.

Although both these coating compositions had cure response in a pot, according to ASTM 2369 (1 hour, 110° C.) comparative Example F showed a drop by about 14% in non-volatiles when compared to its theoretical %. This indicates that some 2-n-butyl-2-ethyl-1,3-propanediol has volatilized during the curing process. In contrast, a coating composition based on the melamine polyol according to the invention showed no significant difference (less than 3%) between the theoretical and experimental values in % non-volatiles.

Example 30

A clear coat composition was prepared with a polyacrylate polyol prepared according to Example A4 disclosed in non-published patent application EP 05107563.8 and a melamine polyol according to the present invention. The clear coat composition was prepared as set forth in the Table 9 below

TABLE 9 clear coat formulations

| Raw material | Example 30 % by weight |
|---|---|
| Melamine polyol from Example 15 (83% s.c.) | 52.1 |
| Polyacrylate polyol (Example A4) (74% s.c.) | 32.2 |
| Byk 331 (12% s.c.) | 1.1 |
| Benzoic acid (12% s.c.) | 14.1 |
| 10% dibutyl tin dilaurate solution | 1.5 |
| Tinuvin 292 | 1.2 |
| Tinuvin 1130 | 0.7 |
| Butyl glycol acetate | 4.5 |
| Butyl acetate | 42.1 |
| Tolonate HDT-LV | 52.9 |

The clear coat formulation had a NCO:OH ratio of 1:1. The solid content of the coating composition was 61.4%. The VOC was 389 g/l.

A steel panels was coated with a dark grey metallic water based basecoat composition. The clear coat as prepared above was applied by spray gun over the basecoat. The bottom of the panel received an additional layer to check pinhole sensitivity. The coatings were cured at 60° C. The properties of the coating compositions are listed in Table 10.

TABLE 10

| Ex. No. | Viscosity (sec, DC 4) | | | Curing 60° C. | | Persoz Hardness | | | Appearance |
|---|---|---|---|---|---|---|---|---|---|
| | Start | 40 min. | 90 min. | 15 min. | 25 min. | 2 hrs | 1 day | 7 days | |
| 30 | 13.8 | 16.7 | 22.4 | FTH, very tacky | FTH, tacky | 22 | 70 | 87 | 7, no defects (no pinholes) |

The invention claimed is:

1. A coating composition comprising
   i) a melamine polyol comprising the reaction product of:
   (a) at least one melamine aldehyde resin having the formula (I)

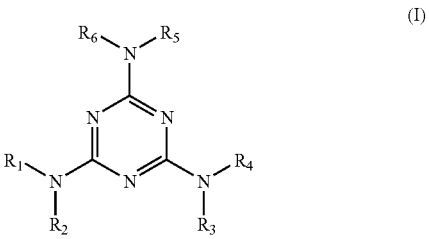

wherein $R_1$ to $R_6$ are each selected from —H, —$CH_2OH$, —$CH_2OR_7$, and may be the same or different, wherein $R_7$ is a $C_1$ to $C_5$ alkyl group
   (b) at least one α,γ-diol, wherein the α,γ-diol is 2-butyl-2-ethyl-1,3-propane diol
   wherein the diol (b) and the resin (a) are reacted in such relative amounts that the ratio of the number of hydroxyl groups from diol (b) to the total number of $R_1$ to $R_6$ groups from resin (a) is in the range of 1.25 to 2.25, and
   ii) a crosslinker which is a blocked or unblocked polyisocyanate.

2. The coating composition according to claim 1, wherein $R_1$ to $R_6$ are the same.

3. The coating composition according to claim 1, wherein $R_1$ to $R_6$ are each —$CH_2OCH_3$.

4. The coating composition according to claim 1, wherein the melamine polyol has a number average molecular weight between 700 and 4000.

5. The coating composition according to claim 1, wherein the melamine polyol is the reaction product of further:
   (c) a compound (c) containing a single functional group capable of reacting with the melamine aldehyde resin.

6. The coating composition according to claim 5, wherein the compound (c) further contains other functional groups.

7. The coating composition according to claim 1 further comprising a hydroxyl functional binder.

8. The coating composition according to claim 1, wherein the composition is a clear coat composition.

9. A method of coating an automobile, said method comprising applying a coating composition according to claim 1 to at least a portion of the surface of an automobile.

10. The method according to claim 9, wherein the method is implemented for repairing the automobile.

* * * * *